UNITED STATES PATENT OFFICE.

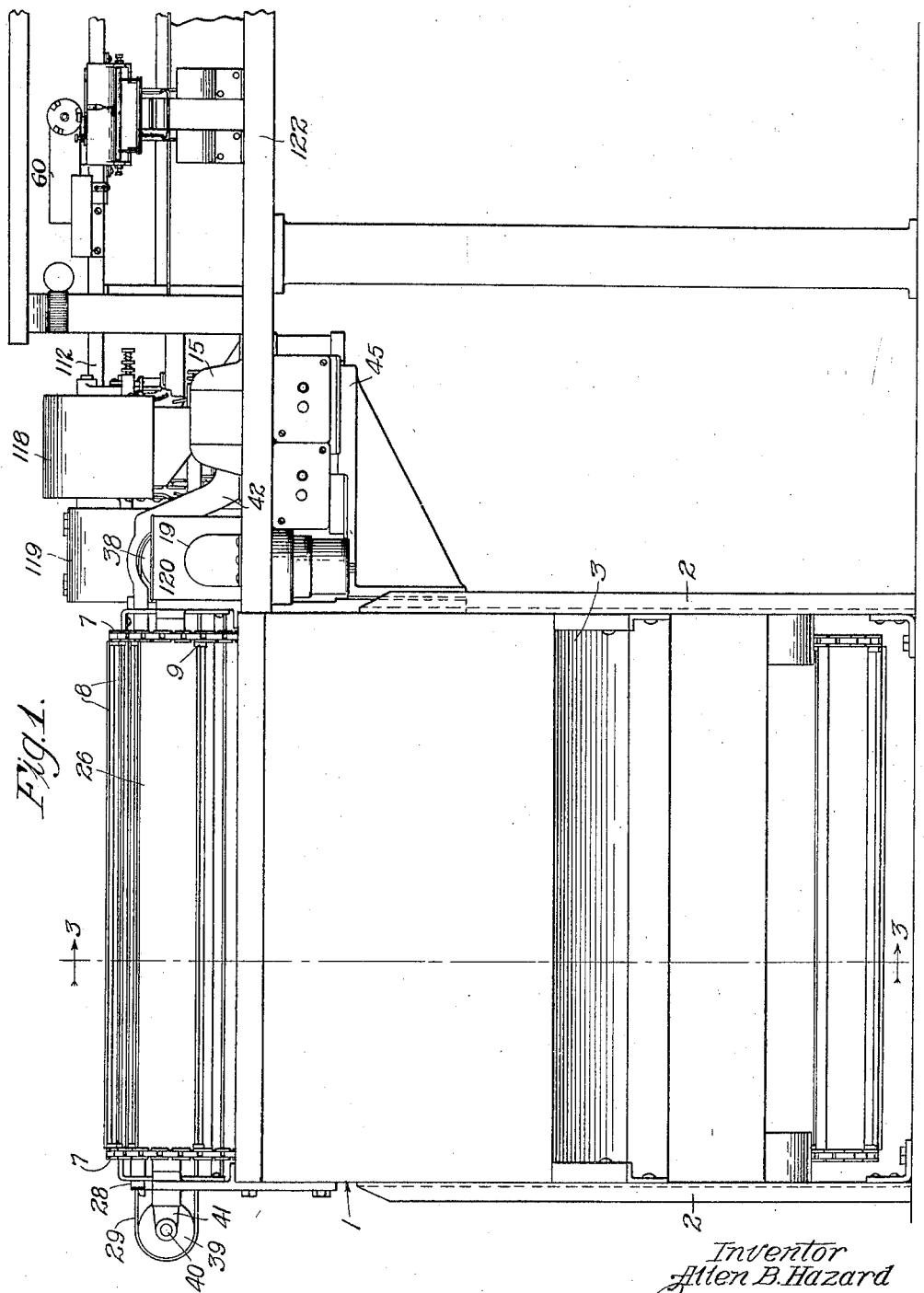

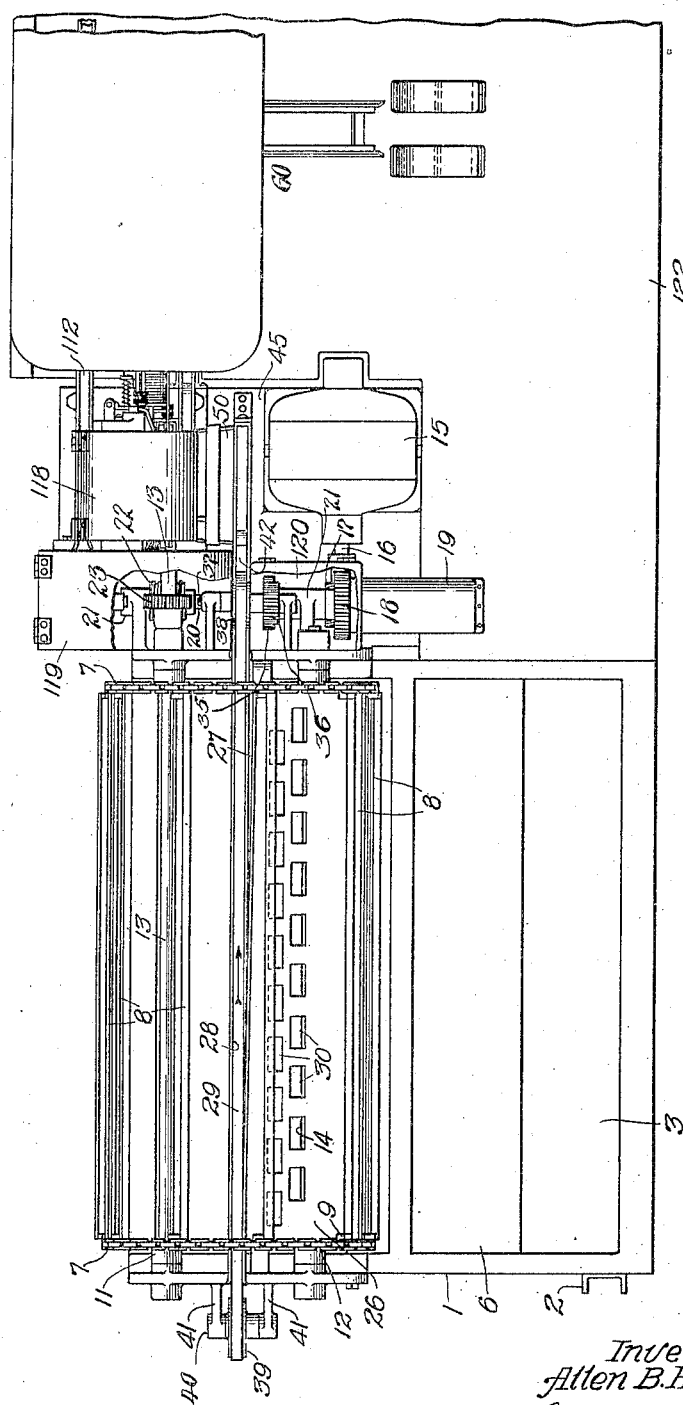

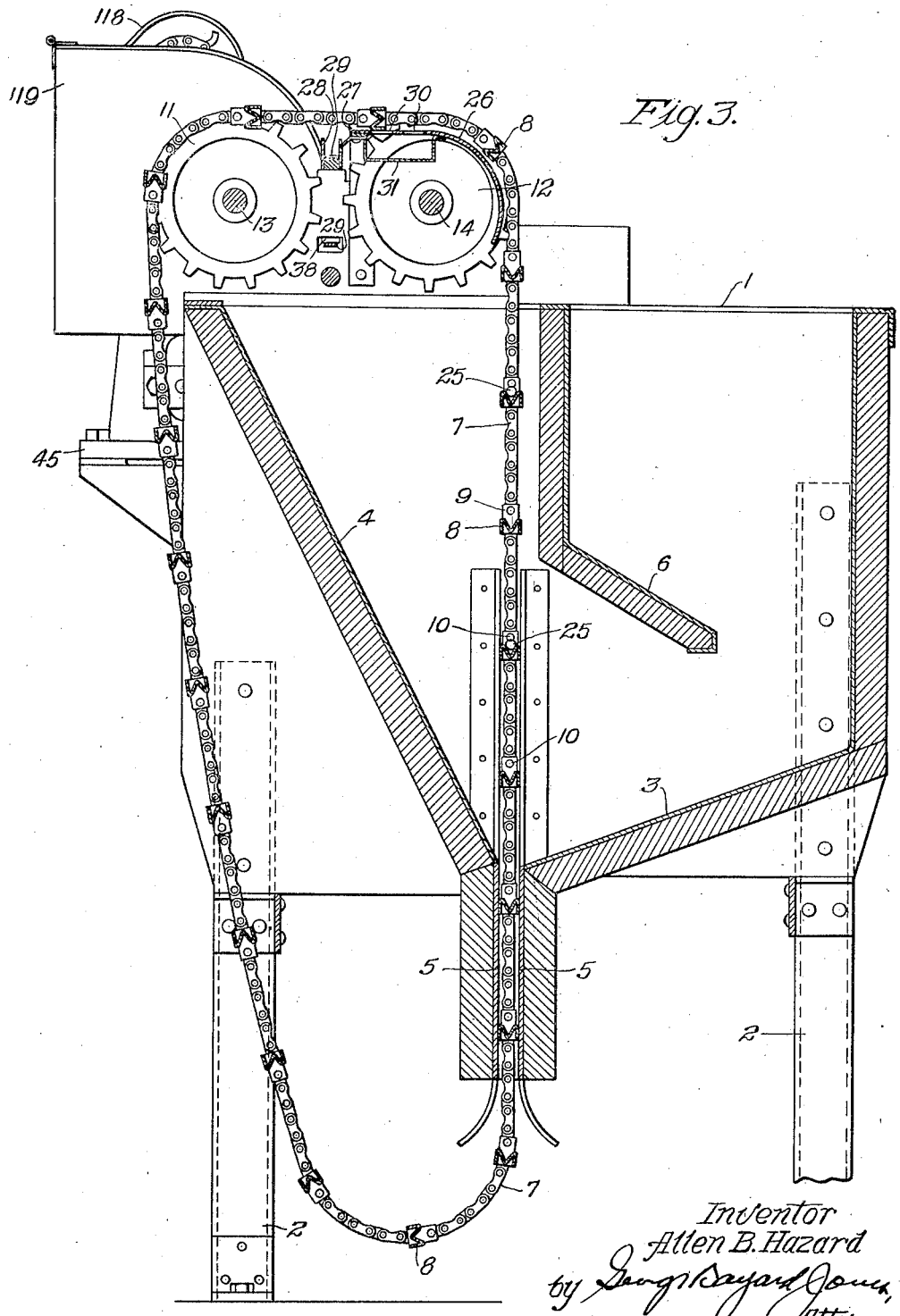

ALLEN B. HAZARD, OF BERWYN, ILLINOIS, ASSIGNOR TO WESTERN ELECTRIC COMPANY, INCORPORATED, OF NEW YORK, N. Y., A CORPORATION OF NEW YORK.

CONVEYING MECHANISM.

1,346,314.   Specification of Letters Patent.   Patented July 13, 1920.

Original application filed September 1, 1915, Serial No. 48,513. Divided and this application filed November 8, 1917. Serial No. 200,916.

*To all whom it may concern:*

Be it known that I, ALLEN B. HAZARD, a citizen of the United States, residing at Berwyn, in the county of Cook and State of Illinois, have invented certain new and useful Improvements in Conveying Mechanism, of which the following is a full, clear, concise, and exact description.

This invention relates to an improved conveying mechanism, and more particularly to a conveying mechanism which is provided with means for supplying articles in regular order and substantially continuously to a testing apparatus from which the articles are conveyed and distributed in equal numbers to a plurality of stations.

This application is a division of my application, Serial No. 48,513, filed September 1, 1915. The preferred embodiment of the conveying mechanism herein illustrated and described has been applied to a fuse testing machine. However, the invention is not limited to this particular application, but may be adapted, with but slight variation within the scope of the appended claims, to a great number of uses and a large number of other mechanisms.

The object of the invention consists in producing a conveying mechanism which is equipped with improved means for separating articles from a large mass of said articles promiscuously dumped into a hopper and thereafter continuously conveying said articles to a desired location, the articles being carried and placed in a definite, predetermined position at said location.

Other features of the invention will become apparent from the following description and the appended claims.

In the accompanying drawings in which an embodiment of the invention is illustrated:

Figure 1 is an elevation of one part of the machine;

Fig. 2 is a top plan view thereof;

Fig. 3 is an enlarged section on the line 3—3 of Fig. 1.

The conveying mechanism which forms the subject matter of the present application has been herein illustrated in connection with the fuse testing machine which forms the subject matter of my application above identified. The entire machine is fully described in said application, and accordingly a description herein of the machine, aside from the portion thereof which forms the subject matter of the present application, will be dispensed with as the same forms no part hereof.

Referring more in detail to the drawings, 1 designates a hopper from which the fuses are lifted by means of the buckets of an endless chain conveyer, and delivered onto an endless feed belt by means of which said fuses are carried, in the embodiment of the invention herein illustrated, to the magazine of the fuse testing mechanism. The hopper 1 has a capacity of about four thousand fuses. It is made preferably of wood lined with sheet iron and is supported on suitable standards or legs 2, preferably in the form of channel irons. The bottom of the hopper 3 is sloping, as shown in Fig. 3, and the rear wall 4 thereof is inclined somewhat from the vertical, said bottom and rear walls being extended downwardly, as shown at 5, 5 to form a narrow vertical passageway having a flaring opening at its lower end. An inclined deflector 6 is provided, hereinafter described. A pair of endless chains 7 are arranged in said passageway and are connected by a plurality of troughs or buckets 8 made of sheet metal and resembling in cross-section the letter M. They are secured at opposite ends to blocks 9 carried by the chains 7 by means of extended rivets or pins 10. The endless conveyer thus formed is supported on two pairs of sprocket wheels 11, 12, the rear wheels 11 being mounted on the driving shaft 13, and the forward wheels 12 being mounted on an idler shaft 14.

The conveyer may be driven by any suitable source of power, such for example, as an electric motor 15 which carries on its armature shaft 16 a worm 17 meshing with the gear 18. An inclosed friction drive and clutch 19 is associated with said gear and drives a shaft 20 mounted in suitable brackets 21. The friction drive may be of any suitable standard construction and need not be described herein. The motor may be supported on a suitable shelf or table 45.

The shaft 20 extends from the front to the rear of the machine, as shown in Fig. 2, and near the end thereof carries a worm 22 which meshes with the gear 23 directly above it, said gear being mounted on the shaft 13, whereby the conveyer is driven by the motor through the various gears thus described.

The fuses to be tested are simply dumped into the hopper, into which they fall in great disorder although they tend to arrange themselves parallel to the buckets 8, a certain percentage of them rolling into said buckets as the latter ascend through the mass of fuses. A fuse 25 is shown in one of the buckets in Fig. 3. Each bucket is long enough to accommodate about five fuses end to end, but owing to the irregular arrangement of the fuses in the hopper, the buckets, as they ascend, may contain from 1 to 5 fuses in proper alinement. They may contain one or more additional fuses resting on top of those which are properly located in the buckets, such additional fuses falling off, however, subsequently as hereinafter explained.

The sloping bottom wall 3 of the hopper, and the inclined rear wall 4 thereof, are set at such angles as to prevent the mass of fuses from becoming too deep at the point where the buckets rise through them. The deflector 6 contributes to this result by directing the fuses to the front as they are dumped into the hopper and taking the weight of the superimposed fuses from the lowermost part of the hopper where said weight would tend to be concentrated. Otherwise, the weight of the mass would be so great as to distort said buckets. The chains hang freely from the two sets of sprockets, as shown in Fig. 3, except that one side is guided in its upward movement.

Directly beneath the conveyer, where the chains begin to bend around their sprocket wheels and assume a horizontal position, at the upper portion of their travel, a sheet metal apron 26 is provided, see Figs. 2 and 3. The edge of said apron is not exactly at right angles to the direction of travel of the conveyer, but is inclined very slightly with respect thereto, as shown in said figures. At its rear it is turned upward slightly to form a lip 27. As the chains bend around the sprockets and begin their horizontal travel, the buckets are turned on one side, and the fuses in each bucket roll out more or less in advance of said bucket, and mainly parallel thereto, and are pushed over said lip by said buckets, whereby they fall into the channel 28 onto the endless belt 29, which belt conveys them in the direction shown by the arrow in Fig. 2. Such fuses as do not happen to be approximately parellel to the lip 27 as they are rolled toward it along the apron 26, are restrained momentarily at one end or the other by said lip, whereby they are pushed around parallel to it by the buckets as they are crowded over said lip onto said belt. Since said lip is not exactly parallel to said belt, the fuses at the righthand side of the apron drop onto the belt slightly before those at the lefthand side thereof, whereby said fuses are spaced apart more than they would otherwise be, thus preventing one crowding the other when they reach the magazine. The apron 26 has a plurality of openings 30 therein arranged preferably in two rows, the openings in one row being staggered with respect to the other row. It sometimes happens that extra nuts, such as are used on the screwthreaded terminals at the ends of said fuses, are found in the hopper. Such loose parts and other foreign objects, drop through said openings and fall into tray 31, whereby they are prevented from reaching the traveling belt 29 and being conveyed to the main portion of the testing machine.

The shaft 20 is driven by the electric motor through suitable gearing previously described, and is provided with a gear 35 which meshes with the gear 36 immediately above it, the latter gear being fixed to the shaft 27 to which is also fixed the pulley 38. The belt 29 passes over said pulley 38 and also over a second pulley 39 at the opposite end thereof, the latter pulley being mounted on a shaft 40 carried in suitable bearings 41.

The fuses are carried along by the belt 29 into one end of a chute 42 down which they slide by gravity to the magazine 50 of the testing mechanism, which latter is housed within a suitable sheet metal hood 118. Other hoods 119 and 120 are also provided to cover and protect the different parts of the gearing or power transmitting mechanism, previously described. The function of the conveying apparatus is to feed the fuses to the testing part of the machine with as much regularity as possible, and with the fuses following each other in quick succession, but not piled one on top of the other. It is immaterial, however, which end of the fuses is presented first. From the testing mechanism the fuses are deposited on another belt conveyer 112 which carries them to the distributer mechanism designated generally as 60, which mechanism comprises suitable means for throwing off or discharging said fuses at a plurality of points along the table or bench 122 as they travel along said belt, so that the same may be quickly and easily inspected and packed by the operators. As the testing and distributing mechanisms form no part of the present application, a detailed disclosure of the same is dispensed with.

It will be obvious to those skilled in the art that the invention is not limited to the particular embodiment thereof herein described in detail as various changes and modifications may be made therein without departing from the spirit of the invention as defined in the appended claims. Furthermore, various other embodiments of the invention may be devised applicable to other uses than the one herein described and illustrated.

What is claimed is:

1. In a testing machine, a conveyer consisting of a pair of chains, buckets secured at opposite ends to said chains, said buckets consisting of sheet metal having a cross-section similar to the letter M, and forming a long narrow trough with side reinforcements.

2. In a testing machine, the combination with a conveyer having long narrow buckets adapted to receive a plurality of elongated articles in alinement, of a horizontal support adjacent thereto across which said articles are moved by said conveyer, and a projection at the end of said support over which said objects are crowded, said projection insuring a parallel arrangement of said objects with respect thereto during such movement.

3. In a device of the class described, a hopper, a conveyer movable vertically through said hopper and then horizontally and having buckets designed to pick up the articles in said hopper in definite arrangement, a table beneath the horizontally moving portion of said conveyer onto which are deposited the articles lifted from said hopper, and as arranged in said buckets and a belt below the level of said table for conveying said articles as thus arranged in a direction parallel to the length of said buckets.

4. In a device of the class described, a hopper, a table above the same, a conveyer for elevating the articles from said hopper to said table, and a lip at the termination of said table over which said articles are pushed by said conveyer after being deposited on said table, whereby said articles are moved to a position parallel to said lip before passing the same.

5. The combination with a conveyer having transverse buckets moving in a horizontal plane, of a belt conveyer beneath the same and moving at an angle thereto, and an apron beneath said buckets terminating adjacent said belt conveyer and provided with an upwardly inclined lip having an inclined edge for the purposes set forth.

6. In a testing machine, a conveyer having long narrow buckets adapted to receive a plurality of elongated articles in alinement, a conveyer belt adjacent thereto, and means for partly inverting said buckets after said articles have been received in such wise as to deposit said articles on said belt in their alined relationship.

7. In combination, an endless conveyer provided with a plurality of buckets, a table over which said buckets are moved partly inverted, and side flanges on said buckets providing skids therefor during such movement.

8. In a testing machine, a conveyer consisting of a pair of chains, buckets secured at opposite ends to said chains, said buckets consisting of sheet metal having a cross section similar to the letter M and forming a long narrow trough with depending side flanges, said side flanges serving as reinforcing elements for said buckets and also as guiding elements therefor.

9. In combination, a hopper having an elongated passageway depending from the bottom thereof, and an endless conveyer movable upwardly through said hopper and entering the same through said passageway, said conveyer being provided with buckets having depending side flanges adapted to slidably engage the side walls of said passageway during the movement of said conveyer therethrough.

10. In combination, a hopper having an elongated passageway depending from the bottom thereof, an endless conveyer movable upwardly through said hopper and entering the same through said passageway, said conveyer being provided with buckets having depending side flanges adapted to slidably engage the side walls of said passageway during the movement of said conveyer therethrough, and a table over which a portion of said conveyer passes substantially horizontally with said buckets partly inverted and in contact with said table, said side flanges serving as skids for said buckets during this latter movement.

11. In combination, a hopper having a passageway through the bottom thereof, an endless conveyer extending through said passageway and upwardly through said hopper, and a deflector mounted within said hopper adjacent said conveyer and projecting at an angle therefrom in such wise as to prevent the concentration of the mass at the point of entrance of said conveyer.

In witness whereof, I hereunto subscribe my name this 26th day of October, A. D. 1917.

ALLEN B. HAZARD.